United States Patent
Dai et al.

(10) Patent No.: US 11,131,841 B2
(45) Date of Patent: Sep. 28, 2021

(54) HIGH-RESOLUTION SCANNING LIGHT FIELD MICROSCOPIC IMAGING SYSTEM AND METHOD

(71) Applicant: TSINGHUA UNIVERSITY, Beijing (CN)

(72) Inventors: Qionghai Dai, Beijing (CN); Zhi Lu, Beijing (CN); Jiamin Wu, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 301 days.

(21) Appl. No.: 16/357,870

(22) Filed: Mar. 19, 2019

(65) Prior Publication Data

US 2020/0241274 A1      Jul. 30, 2020

(30) Foreign Application Priority Data

Jan. 30, 2019   (CN) .......................... 201910094202.X

(51) Int. Cl.
  *G02B 21/22*   (2006.01)
  *G02B 21/36*   (2006.01)
  (Continued)

(52) U.S. Cl.
  CPC ......... *G02B 21/361* (2013.01); *G02B 21/365* (2013.01); *H04N 13/106* (2018.05); *H04N 13/207* (2018.05)

(58) Field of Classification Search
  CPC .. G02B 21/0052; G02B 21/002; G02B 21/06; G02B 21/361; G02B 21/362;
  (Continued)

(56) References Cited

U.S. PATENT DOCUMENTS

| | | | |
|---|---|---|---|
| 10,922,789 B2* | 2/2021 | Dai | G02B 26/101 |
| 2014/0263963 A1* | 9/2014 | Broxton | H04N 5/225 |
| | | | 250/208.1 |

(Continued)

FOREIGN PATENT DOCUMENTS

| | | | | |
|---|---|---|---|---|
| CN | 107091825 A | | 8/2017 | |
| CN | 107678154 A | * | 2/2018 | ............. G02B 21/36 |
| CN | 107678154 A | | 2/2018 | |

OTHER PUBLICATIONS

Edelstein et al (Advanced methods of microscope control using µManager software, J. Biol Methods, 1(2), Jan. 18, 2015, pp. 1-18) (Year: 2015).*

(Continued)

*Primary Examiner* — Stephone B Allen
*Assistant Examiner* — Jyotsna V Dabbi
(74) *Attorney, Agent, or Firm* — David D. Brush; Westman, Champlin & Koehler, P.A.

(57) ABSTRACT

A scanning light field microscopic imaging system includes: a microscope configured to magnify a sample and image the sample onto a first image plane of the microscope; a relay lens configured to magnify or minify the first image plane; a 2D scanning galvo configured to rotate an angle of a light path in the frequency domain plane; the microlens array configured to modulate a beam with a preset angle to a target spatial position at a back focal plane of the microlens array and modulate the first image plane to obtain a modulated image; an image sensor configured to record the modulated image; and a reconstruction module configured to reconstruct a 3D structure of the sample based on the modulated image acquired from the image sensor.

15 Claims, 3 Drawing Sheets

(51) Int. Cl.
*H04N 13/106* (2018.01)
*H04N 13/207* (2018.01)

(58) Field of Classification Search
CPC .............. G02B 21/365; G02B 21/0048; G02B 21/0072; G02B 21/0024; G02B 21/0028; G02B 21/0036; G02B 21/0044; G02B 21/006; G02B 21/0076; G02B 21/008; G02B 21/0032; G02B 21/22; G02B 26/101; G02B 26/12; G02B 26/124; G02B 27/58; H01L 27/14625; H04N 13/207; H04N 13/106; H04N 13/232; H04N 13/229; H04N 5/23296; H04N 5/232; G06T 3/4053; G01Q 60/18; G01Q 60/20; G06K 9/00127
USPC .................................................. 359/368, 376
See application file for complete search history.

(56) References Cited

U.S. PATENT DOCUMENTS

2016/0139388 A1\* 5/2016 Asundi ................ G02B 21/365
348/79
2017/0227350 A1\* 8/2017 Sarunic .................. A61B 3/102

OTHER PUBLICATIONS

English translation of the Office Action dated Nov. 19, 2019 from the Chinese State Intellectual Property Office, for corresponding Chinese Application No. 201910094202.X.

\* cited by examiner

HIGH-RESOLUTION SCANNING LIGHT FIELD MICROSCOPIC IMAGING SYSTEM AND METHOD

CROSS-REFERENCE TO RELATED APPLICATION

This application claims priority to and benefits of Chinese Patent Application Serial No. 201910094202.X, filed with the State Intellectual Property Office of P. R. China on Jan. 30, 2019, the entire content of which is incorporated herein by reference.

FIELD

The present disclosure relates to the field of computational optical microscopy, and more particularly to a scanning light field microscopic imaging system and method.

BACKGROUND 3D (three-dimensional) imaging of a sample is important for biological research. However, only a 2D (two-dimensional) image is captured by a camera at a time. Researchers have been working on effective 3D imaging methods. Until now, there are mainly two 3D microscopic imaging methods exist in the related art.

The first method involves an axial scan of the sample. A common wide field microscope is capable of capturing a 2D sample slice at a focal plane. When the sample is moved by an axial translation stage, sample slices at different depths can be focused, and corresponding images are captured by the camera. These images can be stacked so as to effectively indicate real information of the sample. However, this method has nonegligible disadvantages. The process of axially moving the sample is very slow, which is determined by a stability requirement of a microscope stage. If scanning >20 depth planes, it is difficult to achieve dynamic imaging in real time. What's worse, the liquid component in the sample may flow when the sample is moved, which will result in that 3D imaging is not consist with the sample.

The second method involves a light field microscopy. Both 2D spatial and 2D angle information of lights from the sample can be captured by the light field by appending a microlens array to an image plane of a conventional fluorescence microscope. It is assumed that the number of angles of light field images is Nnum×Nnum in total, each corresponding to a low-resolution sub-image, which is equivalent to passing a real image through low-pass filters with different frequency domains. These low-resolution sub-images may be regarded as a low-resolution Wigner distribution function (WDF). However, the frequency domain is split by the light field into small blocks, which is equivalent to sacrificing spatial resolution to improve angular resolution. Therefore, the traditional light field microscopy has a low spatial resolution and cannot detect the sample accurately.

SUMMARY

Embodiments of the present disclosure seek to solve at least one of the problems existing in the related art to at least some extent.

According to a first aspect of embodiments of the present disclosure, there is provided a scanning light field microscopic imaging system, including: a microscope, including an objective and a tube lens, and configured to magnify a sample and to image the sample onto a first image plane of the microscope; a relay lens, configured to match a numerical aperture of the objective with that of a microlens array and to magnify or minify the first image plane; a 2D scanning galvo, disposed in a frequency domain plane of the relay lens, and configured to rotate an angle of a light path in the frequency domain plane; the microlens array, configured to modulate a light beam with a preset angle to a target spatial position at a back focal plane of the microlens array to obtain a modulated image; an image sensor, disposed at a second image plane of an imaging camera lens and coupled with the microlens array through the imaging camera lens, and configured to record the modulated image; and a reconstruction module, configured to acquire the modulated image from the image sensor and reconstruct a 3D structure of the sample based on the modulated image.

According to a second aspect of embodiments of the present disclosure, there is provided a scanning light field microscopic imaging method, including: magnifying a sample by a microscope and imaging the sample onto a first image plane of the microscope; matching a numerical aperture of an objective with that of a microlens array and magnifying or minifying the first image plane through a relay lens; rotating an angle of a light path in a frequency domain plane through a 2D scanning galvo; modulating a light beam with a preset angle to a target spatial position at a back focal plane of the microlens array through the microlens array to obtain a modulated image; recording the modulated image by an image sensor; and reconstructing a 3D structure of the sample based on the modulated image through a reconstruction module.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
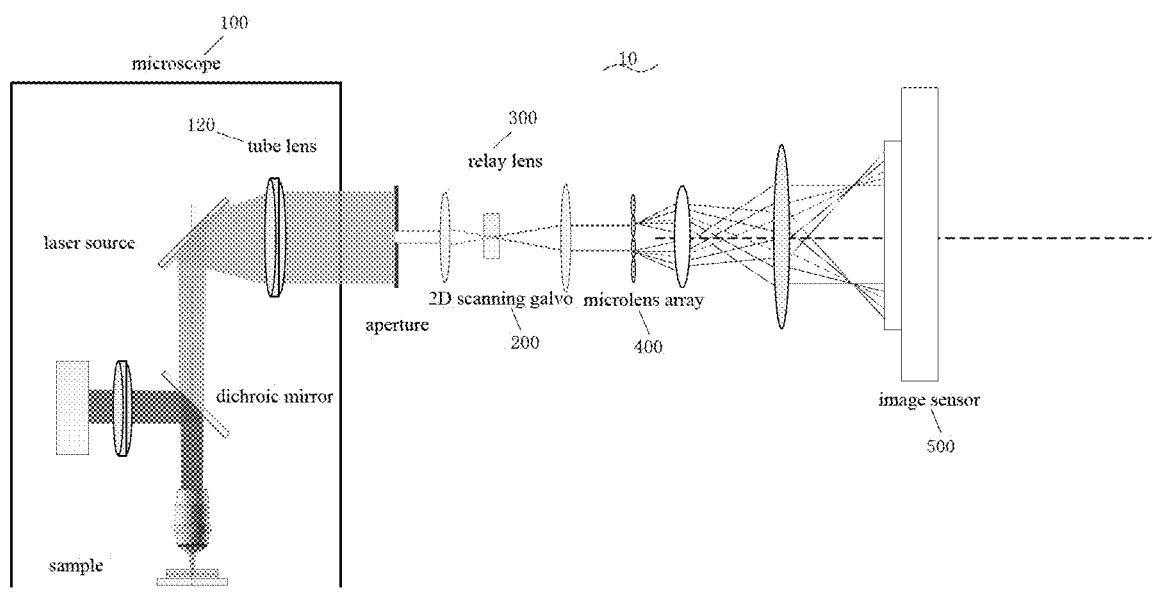
FIG. 1 is a schematic diagram of a scanning light field microscopic imaging system according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

According to a first aspect of embodiments of the present disclosure, there is provided a scanning light field microscopic imaging system, including: a microscope, having an objective and a tube lens, and configured to magnify a sample and to image the sample onto a first image plane of the microscope; a relay lens, configured to match a numerical aperture of the objective with that of a microlens array and to magnify or minify the first image plane; a 2D scanning galvo, disposed in a frequency domain plane of the relay lens, and configured to rotate an angle of a light path in the frequency domain plane; the microlens array, configured to modulate a light beam with a preset angle to a target spatial position at a back focal plane of the microlens array to obtain a modulated image; an image sensor, disposed at a second image plane of an imaging camera lens and coupled with the microlens array through the imaging camera lens, and configured to record the modulated image; and a reconstruction module, configured to acquire the modulated image from the image sensor and reconstruct a 3D structure of the sample based on the modulated image.

The scanning light field microscopic imaging system according to embodiments of the present disclosure combines a light field microscope and a scanning technique, and is realized by shifting sub-pixels of the microlens array to improve a spatial resolution of the light field microscope; adding a scanning optical path on the basis of the light field microscopy to greatly improve an imaging resolution; adding the 2D scanning galvo in front of the microlens array, and incorporating an ordinary computer to perform data processing. Therefore, a high-resolution WDF is obtained by taking advantage of the sub-pixel shift of light field images. Moreover, the scanning light field microscopic imaging system of the present disclosure has a simple structure, low costs, and a fast imaging speed, and is suitable for living cell observation.

In an embodiment of the present disclosure, the tube lens is configured to match and correct a magnification of the objective.

In an embodiment of the present disclosure, the 2D scanning galvo includes an X-direction scanning galvo and a Y-direction scanning galvo, with the frequency domain plane as a coordinate system.

In an embodiment of the present disclosure, the 2D scanning galvo is further configured to rotate a light beam along an x-axis direction through the X-direction scanning galvo and rotate a light beam along a y-axis direction through the Y-direction scanning galvo.

In an embodiment of the present disclosure, the relay lens includes a first lens and a second lens, when the first image plane is located at a front focal plane of the first lens, the magnified or minified first image plane is located at a back focal plane of the second lens, and a magnification or minification of the relay lens is determined by a ratio of a focal length of the first lens to a focal length of the second lens.

In an embodiment of the present disclosure, the relay lens further includes: a first 4f system, including a first front lens and a first rear lens; and a second 4f system, including a second front lens and a second rear lens.

In an embodiment of the present disclosure, the image sensor is selected from a Scientific Complementary Metal-Oxide-Semiconductor Transistor sCMOS monochrome sensor or Charge Coupled Device CCD, or a Complementary Metal-Oxide-Semiconductor Transistor CMOS.

In an embodiment of the present disclosure, the scanning light field microscopic imaging system further includes: a controlling system, configured to simultaneously trigger the 2D scanning galvo and the image sensor.

In an embodiment of the present disclosure, the modulated image is obtained by modulating through the microlens array in a diffraction limit resolution.

According to a second aspect of embodiments of the present disclosure, there is provided a scanning light field microscopic imaging method, including: magnifying a sample by a microscope and imaging the sample onto a first image plane of the microscope; matching a numerical aperture of an objective with that of a microlens array and magnifying or minifying the first image plane through a relay lens; rotating an angle of a light path in a frequency domain plane through a 2D scanning galvo; modulating a light beam with a preset angle to a target spatial position at a back focal plane of the microlens array through the microlens array to obtain a modulated image; recording the modulated image by an image sensor; and reconstructing a 3D structure of the sample based on the modulated image through a reconstruction module.

The scanning light field microscopic imaging method according to embodiments of the present disclosure combines a light field microscope and a scanning technique, and is realized by shifting sub-pixels of the microlens array to improve a spatial resolution of the light field microscope; adding a scanning optical path on the basis of the light field microscopy to greatly improve an imaging resolution; adding the 2D scanning galvo in front of the microlens array, and incorporating an ordinary computer to perform data processing. Therefore, a high-resolution WDF is obtained by taking advantage of the sub-pixel shift of light field images. Moreover, the scanning light field microscopic imaging method of the present disclosure is achieved by a simple imaging system, has low costs and a fast imaging speed, and is suitable for living cell observation.

In the following, a scanning light field microscopic imaging system and method according to embodiments of the present disclosure will be described in detail with reference to drawings.

FIG. 1 is a schematic diagram of a scanning light field microscopic imaging system according to an embodiment of the present disclosure. As illustrated in FIG. 1, the scanning light field microscopic imaging system 10 includes: a microscope 100, a 2D scanning galvo 200, a relay lens 300, a microlens array 400, an image sensor 500 and a reconstruction module 600 (not shown in FIG. 1).

The microscope 100 includes an objective 110 (not shown in FIG. 1) and a tube lens 120, and is configured to magnify a sample and to image the sample onto a first image plane of the microscope. The tube lens 120 is configured to match and correct a magnification of the objective 110. The relay lens 300 is configured to match a numerical aperture (NA) of the objective 110 with that of the microlens array 400 and to magnify or minify the first image plane. The 2D scanning galvo 200 is disposed in a frequency domain plane of the relay lens 300, and configured to rotate an angle of a light path in the frequency domain plane. The microlens array 400 is configured to modulate a light beam with a preset angle to a target spatial position at a back focal plane of the microlens array 400 to obtain a modulated image. The image sensor 500 is disposed at a second image plane of an imaging camera lens and coupled with the microlens array 400 through the imaging camera lens, and configured to record the modulated image. The reconstruction module 600 is configured to acquire the modulated image from the image sensor 500 and reconstruct a 3D structure of the sample based on the modulated image. The scanning light field microscopic imaging system 10 according to embodiments of the present disclosure may obtain a high-resolution WDF by taking advantage of the sub-pixel shift of light field images, has a simple structure, low costs, and a fast imaging speed, and is suitable for living cell observation.

It will be appreciated that, the microscope 100 may be a commercial microscope or other types of microscopes, which will not be specifically limited herein. The 2D scanning galvo 200, which may be referred to as a scanning system or a 2D scanning system, is capable of achieving sub-pixel shift in a spatial plane. The preset angle may be set according to actual situations and may include different angles, which will not be specifically limited herein. For example, the microlens array 400 is configured to modulate light beams with different angles to different spatial positions at the back focal plane of the microlens array 400 to obtain a plurality of modulated images. The image sensor 500 may be a camera sensor, and is capable of acquiring light beams modulated to the different spatial positions at the back focal plane of the microlens array. Light field images acquired by a light field microscopy in the related art may be regarded as a low-resolution WDF; while the scanning light field microscopic imaging system according to embodiments of the present disclosure may obtain the high-resolution WDF by taking advantage of the sub-pixel shift of the light field images. Moreover, the scanning light field microscopic imaging system according to embodiments of the present disclosure has a simple structure, low costs, and a fast imaging speed, and is suitable for living cell observation.

Specifically, the microscope 100 is configured to magnify the sample and image the sample onto an image plane of the microscope so as to output from an output port of the image plane. The relay lens 300 assists the scanning light field microscopic imaging system 10 to match the numerical aperture of the objective 110 with that of the microlens array 400. The 2D scanning galvo 200 rotates the angle of the light path in the frequency domain plane, equivalent to horizontal movement on the spatial plane, achieving the sub-pixel shift. The microlens array 400 is configured to modulate the light beams with different angles to different spatial positions at the back focal plane of the microlens array 400, respectively, so as to obtain the plurality of modulated images. The image sensor 500 is disposed at an image plane of the imaging camera lens, and configured to record an image stack corresponding to the modulated light beams at the back focal plane of the microlens array. The reconstruction module 600 is configured to acquire the image stack from the image sensor 500 and reconstruct the 3D structure of the sample based on the image stack.

In an embodiment of the present disclosure, the scanning light field microscopic imaging system 10 may further include another relay lens system, such as a third 4f system between the microlens array 400 and the image sensor 500. The image sensor 500 is disposed at an image plane of the relay lens system, i.e., the third 4f system, and configured to record the image stack corresponding to the modulated beams at the back focal plane of the microlens array 400.

The microscope 100 may be a wide-field microscope or a wide-field fluorescence microscope, which may be selected as required and will not be specifically limited herein.

In the following, the scanning light field microscopic imaging system 10 will be further described with reference to FIG. 2.

Figure 2:
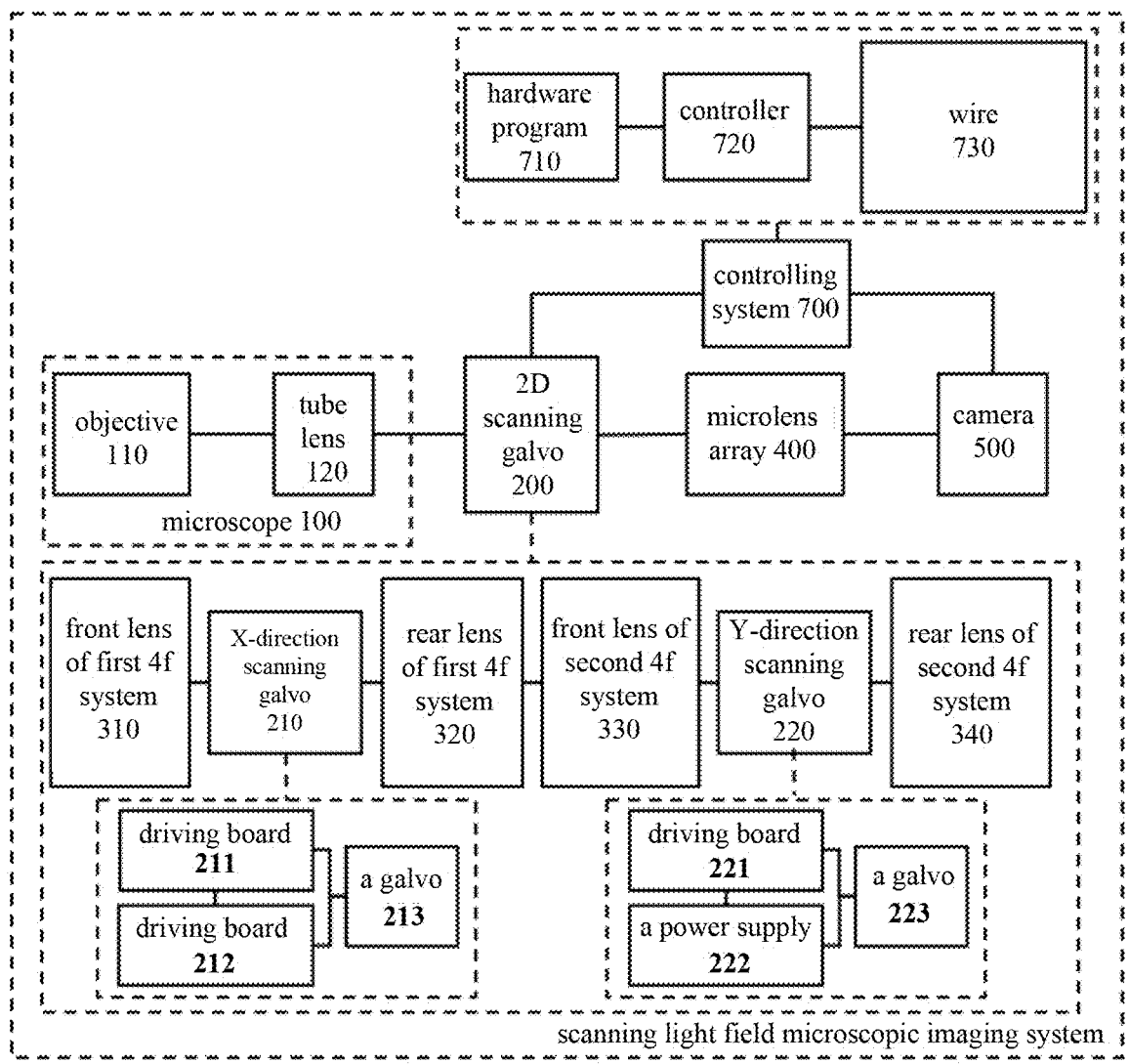
FIG. 2 is a block diagram of a scanning light field microscopic imaging system according to an embodiment of the present disclosure.

Specifically, as illustrated in FIG. 2, the microscope 100 includes the objective 110 and the tube lens 120. The objective 110 is configured to magnify a sample (such as a microscopic sample) and image the sample onto the image plane of the microscope so as to output from the output port of the image plane. In an embodiment, the microscope 100 is a wide-field microscope, and the objective 110 is mounted on the wide-field microscope. The objective 110 may realize primary magnification of the sample. Further, the microscope may output an image plane of the sample through the output port for further processing at a posterior stage. The tube lens 120 is configured to match and correct the magnification of the objective 110 and make sure that a magnification of the microscope 100 is equal to the magnification of the objective 110.

Further, in an embodiment of the present disclosure, the 2D scanning galvo 200 includes an X-direction scanning galvo 210 and a Y-direction scanning galvo 220, with the frequency domain plane as a coordinate system. The 2D scanning galvo 200 is further configured to rotate a light beam along an x-axis direction through the X-direction scanning galvo and rotate a light beam along a y-axis direction through the Y-direction scanning galvo.

Specifically, the 2D scanning galvo 200 is disposed in the frequency domain plane of the scanning light field microscopic imaging system, and may be driven by a specific voltage to rotate the angle of the light path in the frequency domain plane, equivalent to the horizontal movement on the spatial plane.

In an embodiment of the present disclosure, each of the X-direction scanning galvo and the Y-direction scanning galvo includes a driving board and a galvo.

Specifically, as illustrated in FIG. 2, the X-direction scanning galvo includes driving boards 211, 212 and a galvoes 213; and the Y-direction scanning galvo includes a driving board 221, a power supply 222 and a galvo 223.

Further, in an embodiment of the present disclosure, the relay lens 300 includes a first lens and a second lens. When the first image plane is located at a front focal plane of the first lens, the magnified or minified first image plane is located at a back focal plane of the second lens, and a magnification or minification of the relay lens is determined by a ratio of a focal length of the first lens to a focal length of the second lens.

It should be illustrated that, the first lens may be referred to as a primary lens, and the second lens may be referred to as a secondary lens.

The relay lens 300 is configured to match the numerical aperture of the objective 110 with that of the microlens array 400. The relay lens is designed for a specific magnification, and formed as a 4f system. In detail, the 4f system (such as a first 4f system, a second 4f system as described below) includes, for example, two lenses or two camera lenses (which may also be referred to as a primary lens and a secondary lens). A back focal plane of the primary lens coincides with a front focal plane of the secondary lens. When an image plane of an imaging optical path is located at a front focal plane of the primary lens, a magnified or minified image plane will be located at a back focal plane of the secondary lens. A magnification or minification of the image plane is determined by a ratio of a focal length of the primary lens to a focal length of the secondary lens.

In an embodiment of the present disclosure, the relay lens 300 includes a first 4f system and a second 4f system.

Specifically, as illustrated in FIG. 2, the first 4f system includes a first front lens 310 and a first rear lens 320; and the second 4f system includes a second front lens 330 and a second rear lens 340.

The microlens array 400 with a short focal length is disposed at an image plane of the 4f system and is configured to modulate the light beams at different angles to obtain a plurality of modulated images. Information corresponding to different angles is modulated to different spatial positions of the sensor via the microlens array 400, thereby achieving simultaneous imaging at different angles.

In an embodiment of the present disclosure, the modulated image is obtained by modulating through the microlens array 400 in the diffraction limit resolution.

It will be appreciated that, a fluorescence image output from the microscope 100 and scanned by the 2D scanning galvo 200 is modulated by the microlens array 400 in the diffraction limit resolution.

Specifically, the image sensor 500 is disposed at the image plane of the imaging camera lens, and configured to record images corresponding to the modulated beams at the back focal plane of the microlens array. That is, the image sensor 500 is coupled with the microlens array 400 through the imaging camera lens, and configured to simultaneously image all the beams modulated by a prior stage.

In an embodiment of the present disclosure, the scanning light field microscopic imaging system may further include another relay lens system, such as a third 4f system between the microlens array 400 and the image sensor 500, The image sensor 500 is disposed at an image plane of the another relay lens system, i.e., the third 4f system, and configured to record images corresponding to the modulated beams at the back focal plane of the microlens array 400.

In an embodiment of the present disclosure, the image sensor 500 may be, for example, a Scientific Complementary Metal-Oxide-Semiconductor Transistor sCMOS monochrome sensor or Charge Coupled Device CCD, a Complementary Metal-Oxide-Semiconductor Transistor CMOS, or other types of image sensors, which will not be specifically limited herein.

In an embodiment of the present disclosure, the first 4f system, the second 4f system and the third 4f system may be, for example, lenses or imaging camera lenses. That is, the 4f systems at all coupling stages may be implemented by the lenses or the imaging camera lenses. In an embodiment of the present disclosure, in order to ensure that the image plane is sampled in the diffraction limit resolution, magnifications and numerical apertures of optical elements in all the 4f systems may need to be matched correspondingly. The third 4f system includes a primary lens and a secondary lens, and is configured to match a dimensional relationship between the microlens array and the camera.

Further, in an embodiment of the present disclosure, the scanning light field microscopic imaging system 10 further includes a controlling system 700 configured to simultaneously trigger the 2D scanning galvo 200 and the image sensor 500.

Specifically, the controlling system 700 connects the 2D scanning galvo with the camera, which ensures the simultaneous trigger of the 2D canning galvo and the camera. The controlling system 700 may output a specific voltage for the driving boards of the galvoes 213, 223. In an embodiment of the present disclosure, the controlling system 700 includes a hardware program 710, a controller 720 and a wire 730. The hardware program 710 is implemented by LabVIEW software, which provides a voltage required for the 2D scanning galvo and a pulse voltage for triggering the camera. The controller 720 and the wire 730 transmit a signal from a computer to a corresponding device. In an embodiment, the controller 720 may be a control card or a voltage signal generator.

In addition, in an embodiment of the present disclosure, the scanning light field microscopic imaging system may further include for example the reconstruction module 600 (not shown in drawings). The reconstruction module 600 may obtain a set of image stacks of the sample by extracting pixels from the images recorded by the image sensor 500, and reconstruct the 3D structure of the sample based on these image stacks. Each image stack corresponds to a sub-pixel shifted light field. With these image stacks, influences of signals out of the focus plane on an imaging quality may be eliminated, and the 3D structure of the sample is reconstructed.

In an embodiment of the present disclosure, a computational reconstruction process of the reconstructing module may be implemented on a hardware system, such as a common personal computer or a workstation. The computational reconstruction of the sample may be performed using acquired image information.

As compared with other imaging methods, advantages of the scanning light field microscopic imaging system according to embodiments of the present disclosure are that the imaging of the sample may be realized with just several shots, which is attributed to the 2D scanning galvo. As the scanning of the 2D scanning galvo is faster than an axial movement of the sample, the imaging of the sample with the scanning light field microscopic imaging system of the present disclosure is faster than that with a traditional light field microscope. Further, the scanning light field microscopic imaging system according to embodiments of the present disclosure is suitable for living sample observation.

As an example, a principle of the scanning light field microscopic imaging system according to embodiments of the present disclosure may be summarized as follows: using a high magnification objective of the wide-field microscope, arranging the scanning galvo at a Fourier plane, further transmitting the light beams through the microlens array in the limit resolution to obtain the light beams with different angles after modulated by the microlens array, afterwards, adjusting pixel ranges corresponding to each microlens on the image sensor to make the image sensor to obtain the images at different sub-pixel shifted positions in each acquisition, and then using the computational method to eliminate the influence of information out of the focal plane on the focal plane and reconstruct the 3D structure of the sample. The system according to embodiments of the present disclosure has a high image resolution and a fast imaging speed.

Figure 3:
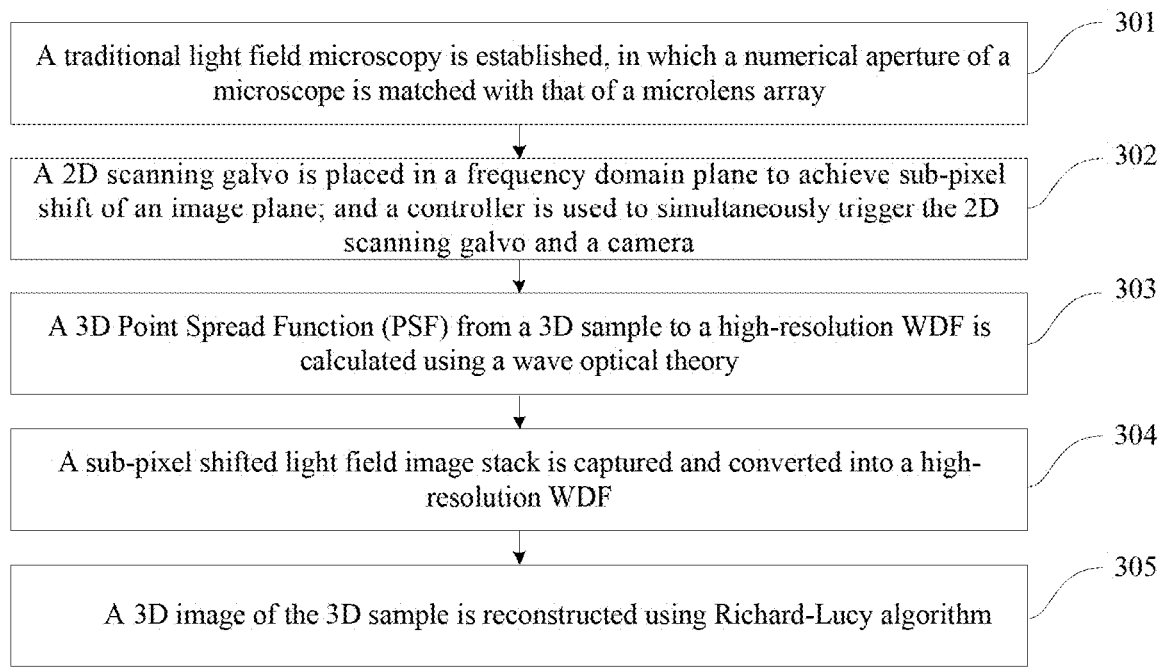
FIG. 3 is a flow chart illustrating a retrofitting and reconstructing process from a traditional light field microscope to a scanning light field microscopic imaging system according to an embodiment of the present disclosure.

In order to make embodiments of the present disclosure easier to understand, a retrofitting and reconstructing process from a traditional light field microscope to the scanning light field microscopic imaging system according to embodiments of the present disclosure is further illustrated with reference to FIG. 3.

Light field is a single shot method for 3D imaging, which has a low-resolution.

In order to solve the above problem, embodiments of the present disclosure provides a light field microscopic 3D imaging system with a fast imaging speed and a high-resolution for the biological application. The scanning light field microscopic imaging system of the present disclosure adds a 2D scanning system on the frequency domain plane and shifts the sub-pixel sampling of the microlens plane to acquire an image stack, which is equivalent to offsetting the pixel binning of the microlens, improving the resolution effectively. Then, the image stack is reconstructed using a Richard-Lucy algorithm. The retrofitting and reconstructing process according to an embodiment of the present disclosure includes the following operations at block as illustrated in FIG. 3.

At block 301, a traditional light field microscopy is established, in which a numerical aperture of a microscope is matched with that of a microlens array. In order to match a numerical aperture of the microscope with that of the microlens array, a relay lens is used to adjust the magnification. Software, such as ZEMAX, is used to optimize parameters of optical elements, so as to reduce aberrations and ensure image quality. Specific operations are as follows.

a) A fluorescent sample is placed on a microscope stage of a wide field microscope and is motivated by a laser. A dichroic mirror and axial spiral of the microscope are adjusted to find a position of a focal plane.

b) The dichroic mirror is adjusted to emit light beams from another image port of the microscope. An aperture is used to find a position of an image plane, and a size of an effective image plane is restrained.

c) The relay lens is added to match the numerical aperture of the microscope with that of the microlens array, and a small circular spot is found and marked to confirm a position of the frequency domain plane.

d) The microlens array is placed at an imaging plane behind the relay lens, and images are acquired at a frequency domain plane of the microlens array. Considering that a position of an image sensor of a camera is fixed, a magnification needs to be adjusted by the relay lens.

At block 302, a 2D scanning galvo is placed in the frequency domain plane to achieve sub-pixel shift of the image plane; and a controller is used to simultaneously trigger the 2D scanning galvo and the camera.

Angle scanning in the frequency domain corresponds to a horizontal movement in the image plane. Then, a range of the angle scanning in the frequency domain is calculated using sizes of sub-pixels behind the microlens array and a distance between the frequency domain plane and the back focal plane of the relay lens.

In embodiments of the present disclosure, a control card is used to control the simultaneous trigger of the 2D scanning galvo and the camera.

At block 303, a 3D Point Spread Function (PSF) from a 3D sample to a high-resolution WDF is calculated using a wave optical theory.

At block 304, a sub-pixel shifted light field image stack is captured and converted into the high-resolution WDF.

All sub-pixels behind the microlens array are scanned to acquire the sub-pixel shifted light field image stack $LF_{s,t,u,v,x,y}$, where s,t represent a spatial position, u,v represent a spatial frequency, and x,y represent the 2D shifted position.

It is assumed that the number of angles of light field images is Nnum×Nnum in total, and the high-resolution WDF of an imaging system in front of the microlens is represented by $W_{s',t',u,v}$, where s',t' represent a high-resolution spatial position, and u,v represent the spatial frequency, then the high-resolution WDF $W_{s',t',u,v}$ is obtained by solving the following formula, where $s_0$ and $t_0$ represent fixed values.

$$LF_{s,t,u,v,x,y} = \sum_{s'=s_0+x}^{s_0+x+Nnum-1} \sum_{t'=t_0+y}^{t_0+y+Nnum-1} W_{s',t',u,v}$$

At block 305, a 3D image of the 3D sample is reconstructed using Richard-Lucy algorithm. The 3D image reconstructed using the Richard-Lucy algorithm reflects the 3D image clearly and accurately.

In summary, the scanning light field microscopic imaging system according to embodiments of the present closure has a simple structure and low costs. With the system according to embodiments of the present closure, a relatively weak excitation light is required for imaging the fluorescence sample, scanning does not need to be performed point-by-point during the imaging process, and thus the imaging speed is fast and the image resolution is high, and the obtained 3D data of the sample has a high-resolution and a high precision. Furthermore, as compared with traditional scanning methods, the scanning light field microscopic imaging system according to embodiments of the present closure combines the optical design and computational reconstruction, and the acquisition time is reduced.

The scanning light field microscopic imaging system according to embodiments of the present disclosure combines a light field microscope and a scanning technique, and is realized by shifting sub-pixels of the microlens array to improve a spatial resolution of the light field microscope; adding a scanning optical path on the basis of the light field microscopy to greatly improve an imaging resolution; adding the 2D scanning galvo in front of the microlens array, and incorporating an ordinary computer to perform data processing. Therefore, the high-resolution WDF is obtained by taking advantage of the sub-pixel shift of light field images. Moreover, the scanning light field microscopic imaging system of the present disclosure has a simple structure, low costs, and a fast imaging speed, and is suitable for living cell observation.

In the following, a scanning light field microscopic imaging method according to an embodiment of the present disclosure will be described with reference to FIG. 4.

Figure 4:
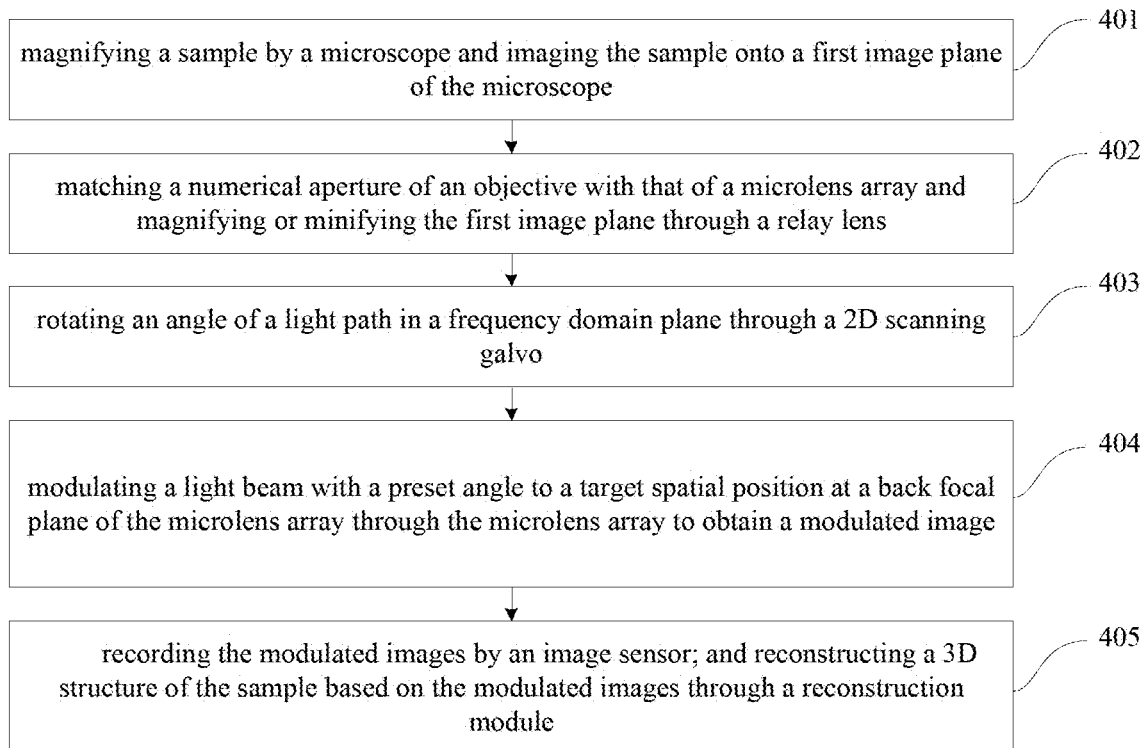
FIG. 4 is a flow chart of a scanning light field microscopic imaging method according to an embodiment of the present disclosure.

FIG. 4 is a flow chart of a scanning light field microscopic imaging method according to an embodiment of the present disclosure. The scanning light field microscopic imaging method includes the following operations at blocks as illustrated in FIG. 4.

At block 401, a sample is magnified by a microscope and is imaged onto a first image plane of the microscope.

At block 402, a numerical aperture of an objective with that of a microlens array is matched through a relay lens and the first image plane is magnified or minified by the relay lens.

At block 403, an angle of a light path is rotated by a 2D scanning galvo in a frequency domain plane.

At block 404, a light beam with a preset angle is modulated to a target spatial position at a back focal plane of the microlens array through the microlens array to obtain a modulated image.

At block 405, the modulated image is recorded by an image sensor, and a 3D structure of the sample is reconstructed by a reconstruction module based on the modulated image.

It should be illustrated that, the above descriptions and explanations for embodiments of the scanning light field microscopic imaging system are also applicable to embodiments of the scanning light field microscopic imaging method, and thus will not elaborated herein.

The scanning light field microscopic imaging method according to embodiments of the present disclosure combines a light field microscope and a scanning technique, and is realized by shifting sub-pixels of the microlens array to improve a spatial resolution of the light field microscope; adding a scanning optical path on the basis of the light field microscopy to greatly improve an imaging resolution; adding the 2D scanning galvo in front of the microlens array, and incorporating an ordinary computer to perform data processing. Therefore, a high-resolution WDF is obtained by taking advantage of the sub-pixel shift of light field images. Moreover, the scanning light field microscopic imaging method of the present disclosure is achieved by a simple imaging system, has low costs and a fast imaging speed, and is suitable for living cell observation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, a phase of "a plurality of" means two or more than two, such as two or three, unless specified otherwise.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A scanning light field microscopic imaging system, comprising:
    a microscope, comprising an objective and a tube lens, and configured to magnify a sample and to image the sample onto a first image plane of the microscope;
    a relay lens, configured to match a numerical aperture of the objective with that of a microlens array and to magnify or minify the first image plane;
    a 2D scanning galvo, disposed in a frequency domain plane of the relay lens, and configured to rotate an angle of a light path in the frequency domain plane;
    the microlens array, configured to modulate a light beam with a preset angle to a target spatial position at a back focal plane of the microlens array to obtain a modulated image;
    an image sensor, disposed at a second image plane of an imaging camera lens and coupled with the microlens array through the imaging camera lens, and configured to record the modulated image; and
    a reconstruction module, configured to acquire the modulated image from the image sensor and reconstruct a 3D structure of the sample based on the modulated image,
    wherein the relay lens and the 2D scanning galvo each are disposed in a light path between the tube lens and the microlens array.

2. The scanning light field microscopic imaging system according to claim 1, wherein the tube lens is configured to match and correct a magnification of the objective.

3. The scanning light field microscopic imaging system according to claim 1, wherein the 2D scanning galvo comprises an X-direction scanning galvo and a Y-direction scanning galvo, with the frequency domain plane as a coordinate system.

4. The scanning light field microscopic imaging system according to claim 3, wherein the 2D scanning galvo is further configured to rotate a light beam along an x-axis direction through the X-direction scanning galvo and rotate a light beam along a y-axis direction through the Y-direction scanning galvo.

5. The scanning light field microscopic imaging system according to claim 3, wherein each of the X-direction scanning galvo and the Y-direction scanning galvo comprises a driving board and a galvo.

6. The scanning light field microscopic imaging system according to claim 1, wherein the relay lens comprises a first lens and a second lens, when the first image plane is located at a front focal plane of the first lens, the magnified or minified first image plane is located at a back focal plane of the second lens, and a magnification or minification of the relay lens is determined by a ratio of a focal length of the first lens to a focal length of the second lens.

7. The scanning light field microscopic imaging system according to claim 6, wherein the relay lens further comprises:
    a first 4f system, comprising a first front lens and a first rear lens; and
    a second 4f system, comprising a second front lens and a second rear lens.

8. The scanning light field microscopic imaging system according to claim 1, wherein the image sensor is selected from a Scientific Complementary Metal-Oxide-Semiconductor Transistor sCMOS monochrome sensor or Charge Coupled Device CCD, or a Complementary Metal-Oxide-Semiconductor Transistor CMOS.

9. The scanning light field microscopic imaging system according to claim 1, further comprising:
    a controlling system, configured to simultaneously trigger the 2D scanning galvo and the image sensor.

10. The scanning light field microscopic imaging system according to claim 9, wherein the controlling system comprises
    a controller; and
    a hardware program, configured to provide a voltage required for the 2D scanning galvo and a pulse voltage for triggering the camera.

11. The scanning light field microscopic imaging system according to claim 10, wherein the controller is a control card or a voltage signal generator.

12. The scanning light field microscopic imaging system according to claim 1, wherein the modulated image is obtained by modulating through the microlens array in a diffraction limit resolution.

13. A scanning light field microscopic imaging method, comprising:

magnifying a sample by a microscope and imaging the sample onto a first image plane of the microscope;

matching a numerical aperture of an objective with that of a microlens array and magnifying or minifying the first image plane through a relay lens;

rotating an angle of a light path in a frequency domain plane through a 2D scanning galvo;

modulating a light beam with a preset angle to a target spatial position at a back focal plane of the microlens array through the microlens array to obtain a modulated image;

recording the modulated image by an image sensor; and reconstructing a 3D structure of the sample based on the modulated image through a reconstruction module, wherein the relay lens and the 2D scanning galvo each are disposed in a light path between the tube lens and the microlens array.

14. The scanning light field microscopic imaging method according to claim 13, wherein rotating an angle of a light path in a frequency domain plane through a 2D scanning galvo comprises:

rotating a light beam along an x-axis direction through an X-direction scanning galvo and rotating a light beam along a y-axis direction through a Y-direction scanning galvo.

15. The scanning light field microscopic imaging method according to claim 13, further comprising:

controlling simultaneous trigger of the 2D scanning galvo and the image sensor.

\* \* \* \* \*